(12) United States Patent
Nolte et al.

(10) Patent No.: US 12,466,949 B2
(45) Date of Patent: Nov. 11, 2025

(54) E/E COMPONENT CONTAINING POLYCARBONATE MATERIAL HAVING HIGH TRACKING RESISTANCE

(71) Applicant: Covestro Deutschland AG, Leverkusen (DE)

(72) Inventors: Marius Nolte, Cologne (DE); Matthias Knaupp, Langenfeld (DE); Tim Hungerland, Cologne (DE); Joachim Morick, Leverkusen (DE); Constantin Schwecke, Alfter (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 19/109,608

(22) PCT Filed: Sep. 20, 2023

(86) PCT No.: PCT/EP2023/075987
§ 371 (c)(1),
(2) Date: Mar. 7, 2025

(87) PCT Pub. No.: WO2024/068403
PCT Pub. Date: Apr. 4, 2024

(65) Prior Publication Data
US 2025/0263551 A1 Aug. 21, 2025

(30) Foreign Application Priority Data
Sep. 29, 2022 (EP) .................................... 22198823

(51) Int. Cl.
*H01B 7/295* (2006.01)
*C08L 69/00* (2006.01)

(52) U.S. Cl.
CPC .............. *C08L 69/00* (2013.01); *H01B 7/295* (2013.01)

(58) Field of Classification Search
None
See application file for complete search history.

(56) References Cited

U.S. PATENT DOCUMENTS

| | | | |
|---|---|---|---|
| 3,419,634 A | 12/1968 | Vaughn, Jr. | |
| 3,553,167 A | 1/1971 | Hermann et al. | |
| 4,075,173 A | 2/1978 | Maruyama et al. | |
| 4,269,964 A | 5/1981 | Freitag et al. | |
| 4,311,823 A | 1/1982 | Imai et al. | |
| 4,334,053 A | 6/1982 | Freitag et al. | |
| 4,584,360 A | 4/1986 | Paul et al. | |
| 6,093,759 A | 7/2000 | Gareiss et al. | |
| 6,329,139 B1 * | 12/2001 | Nova | B82Y 10/00 506/40 |
| 6,413,153 B1 * | 7/2002 | Molar | B24D 7/063 451/259 |
| 11,208,553 B2 | 12/2021 | Kim et al. | |
| 2009/0163064 A1 * | 6/2009 | Janulis | H01R 4/22 439/271 |
| 2012/0248384 A1 | 10/2012 | van de Wetering et al. | |
| 2018/0187003 A1 | 7/2018 | Jung et al. | |
| 2023/0111479 A1 * | 4/2023 | Auvray | H01B 3/006 174/121 A |
| 2023/0154649 A1 * | 5/2023 | Imasato | H01B 7/04 174/121 A |
| 2025/0188273 A1 * | 6/2025 | Nolte | C08K 5/521 |
| 2025/0206946 A1 * | 6/2025 | Hungerland | C08L 69/00 |

FOREIGN PATENT DOCUMENTS

| | | |
|---|---|---|
| DE | 961668 C | 4/1957 |
| DE | 2232877 A1 | 1/1974 |
| DE | 2714544 A1 | 10/1977 |
| DE | 3007934 A1 | 9/1981 |
| DE | 3832396 A1 | 2/1990 |
| EP | 0728811 A2 | 8/1996 |

OTHER PUBLICATIONS

F. Acquasanta et al., Polymer Degradation and Stability, vol. 96, Issue 12, Dec. 2011, pp. 2098-2103.
H. Schnell, "Chemistry and Physics of Polycarbonates", Interscience Publishers, 1964.
W. Scholtan, H. Lange, Kolloid, Z. und Z. Polymere 250 (1972), 782-796.
Ullmanns Enzyklopädie der Technischen Chemie, vol. 19 (1980), p. 280 ff.
Ullmanns Enzyklopädie der technischen Chemie, vol. 18, p. 301 ff. 1979.
Houben-Weyl, Methoden der organischen Chemie, vol. 12/1, p. 43.
Beilstein vol. 6, p. 177.
International Search Report PCT/EP2023/075987, date of mailing: Nov. 28, 2023, Authorized officer: Francis Adigbli.

* cited by examiner

*Primary Examiner* — Krystal Robinson
(74) *Attorney, Agent, or Firm* — John E. Mrozinski, Jr.

(57) ABSTRACT

The present invention relates to an E/E component comprising electrical conductors L1 and L2, which are connected via a thermoplastic material M. The distances between the electrical conductors L1 and L2 are dependent on the operating voltage of the E/E component. The thermoplastic material comprising polycarbonate, selected rubber-modified graft polymer and phosphorus-containing flame retardant exhibits a high tracking resistance and allows small distances and hence a small design overall.

15 Claims, No Drawings

E/E COMPONENT CONTAINING POLYCARBONATE MATERIAL HAVING HIGH TRACKING RESISTANCE

CROSS REFERENCE TO RELATED APPLICATIONS

This application is a national stage application under 35 U.S.C. § 371 of PCT/EP2023/075987, filed Sep. 20, 2023, which claims benefit of EP Application Serial No. 22198823.1, filed Sep. 29, 2022, both of which are incorporated herein by reference in their entireties.

FIELD OF THE INVENTION

The present invention relates to an E/E component containing a flame-retarded polycarbonate composition having a high tracking resistance and to the use of a particular combination of rubber-modified graft polymer and a flame retardant for improving tracking resistance and flame retardancy of polycarbonate compositions.

BACKGROUND OF THE INVENTION

Polycarbonate compositions and polycarbonate blends are used for a great many applications in the automotive sector, in the construction sector and in the electricals/electronics sector (E/E).

For applications from the field of electricals/electronics (E/E), good insulation properties and high flame retardancy are highly relevant to safety. Such requirements are becoming increasingly important for example also in the field of electromobility. If the thermoplastic material (i.e. the polymer material) is in direct contact with current-conducting parts such as conductor tracks, then a high tracking resistance is also important. Tracking currents can otherwise cause charge to be transferred via the surface of the plastic over further distances than would be possible directly through the air at the same voltage. This is even the case with materials that intrinsically have high insulating properties, such as plastics. The tendency toward tracking current formation should therefore be as low as possible in order to reduce the risk of short circuits and thus to avoid fires. In addition, a high tracking resistance makes it possible to reduce the distances between for example electrical conductor tracks and thus to achieve smaller component sizes or to operate the components with higher operating voltages.

The CTI ("comparative tracking index") is a measure for the tracking resistance of a plastic. This makes it possible to express the extent to which the surface of the plastic enables the formation of tracking currents due to the influence of dirt or liquid when an electrical voltage is applied. The higher the tracking resistance, the better the material is suited for components to which high voltages are applied and/or which during use can become dirty or come into contact with moisture. The CTI is given in volts and states that up to this voltage no significant tracking current occurs in the case of the droplet application of a certain amount of an electrolyte solution.

An alternative determination method for measuring the tracking resistance is the PTI ("proof tracking index") described in the examples section. This method may especially be used for characterization of components to test the tracking resistance of the component toward voltage ranges that are known to be critical.

In comparison with other polymers such as polyethylene, polycarbonate has only a low tracking resistance with a CTI value of about 250 V. However, CTI values of 600 V are required for some high-voltage applications, such as in the field of electromobility. Furthermore, the materials for such applications should have a very high flame retardancy according to UL 94 V, preferably a classification of V0 at thin wall thicknesses such as 1.5 mm.

The flame retardancy of polycarbonate and polycarbonate blends is usually improved by the addition of flame retardants. However, some flame retardants increase the tendency toward tracking current formation, and thus result in an undesirable lowering of the CTI. Furthermore, flame retardants often also have a negative influence on the heat distortion resistance and the toughness such as the impact strength.

For the abovementioned reasons, E/E components made of polycarbonate compositions as the thermoplastic material are difficult to realize. It is possible in principle to increase the distances between the conductor tracks to such an extent as to largely rule out the risk of short circuits and fires due to tracking currents. As mentioned above, however, such an approach runs counter to the desire to produce extremely small components and employ them in corresponding applications.

A number of publications have therefore described approaches for providing polycarbonate compositions having an improved CTI.

EP 3560997 A2 discloses a thermoplastic resin composition which has good properties such as high CTI and comprises: (A) 100 parts by weight of polycarbonate; (B) 2 parts by weight to 6 parts by weight of a cyclic phosphazene compound flame retardant; (C) 0.1 part by weight to 5 parts by weight of an impact modifier; and (D) 1 part by weight to 3 parts by weight of a fluorinated polyolefin.

US 2012/0248384 A1 discloses polycarbonate compositions, methods and articles of manufacture that meet at least certain electrical tracking resistance requirements. The compositions, methods and articles of manufacture that meet these requirements contain at least a polycarbonate, a polysiloxane block copolycarbonate and a transition metal oxide, for example titanium dioxide.

The relationships between fire characteristics (GWFI) and tracking resistance are addressed in the publication: "Glow wire ignition temperature (GWIT) and comparative tracking index (CTI) of glass fibre filled engineering polymers, blends and flame retarded formulations" (Polymer Degradation and Stability, Volume 96, Issue 12, December 2011, pages 2098-2103).

Since the provision of E/E components having the necessary flame retardancy properties and high CTI from polycarbonate compositions is difficult, other thermoplastic materials such as polyesters or polyamides are often employed for such applications. However, polycarbonate and polycarbonate blend compositions provide an interesting combination of properties of high heat distortion resistance and high toughness and it was therefore desirable to provide E/E components comprising a thermoplastic material having such properties without undesirably increasing the distances between the electrical conductors.

DETAILED DESCRIPTION OF THE INVENTION

It was especially desirable to provide an E/E component comprising a thermoplastic material which features a combination of high CTI, high flame retardancy, high heat distortion resistance and impact strength. It was especially desirable for the thermoplastic material, preferably made of a polycarbonate composition, to have a CTI of at least 400 V, preferably 600 V, preferably determined by the rapid test method based on IEC 60112:2009 described in the examples section, a PTI of 300 V and 350 V, preferably determined by the rapid test method based on IEC 60112:2009 described in the examples section, a UL 94 classification of at least V2 at 1.5 mm, a Vicat softening temperature measured according to DIN ISO 306 (2013 version, method B/120) of at least 105° C. and an Izod notched impact strength of at least 40 kJ/m2 according to ISO 180-1A (2019 version).

It has surprisingly been found that the desired properties are exhibited by an E/E component comprising a first electrical conductor L1 and a second electrical conductor L2 at a first distance d1 and a second distance d2 to one another, which are connected via a thermoplastic material M which is in direct contact with the first electrical conductor and the second electrical conductor,
wherein the distance d1 is the shortest distance between the first electrical conductor and the second electrical conductor along the surface of the thermoplastic material M and
wherein the distance d2 is the shortest distance between the first electrical conductor and the second electrical conductor through the air,
wherein d2 is selected in such a way that at the respective operating voltage U for the component a sparkover through the air is prevented,
wherein d1, at the operating voltage U listed below, has the following values:

$$d1(0 \text{ V} \leq U \leq 250 \text{ V}): 1.3 \text{ mm to } <2.5 \text{ mm}$$

$$d1(250 \text{ V} < U \leq 500 \text{ V}): 2.5 \text{ mm to } <5.0 \text{ mm}$$

$$d1(500 \text{ V} < U \leq 1000 \text{ V}) = 5.0 \text{ mm to } <10.0 \text{ mm}$$

and wherein the thermoplastic material M comprises the following components:
A) at least one aromatic polycarbonate, aromatic polyester carbonate or mixtures thereof,
B) at least 5% by weight of at least one rubber-modified graft polymer having a graft substrate selected from the group consisting of acrylate rubbers, polybutadiene rubbers and styrene-butadiene block copolymer rubbers and a graft superstrate free from structural units derived from acrylonitrile
C) at least 5% by weight of at least one phosphorus-containing flame retardant.

Components A, B and C and optionally D thus form the composition of the thermoplastic material M.

It is preferable when the thermoplastic material M (i.e. the composition) comprises 50% to 85% by weight, more preferably 65% to 80% by weight, of component A, 5% to 15% by weight, more preferably 6% to 12% by weight, of component B, and 5% to 15% by weight, more preferably 6% to 12% by weight, of component C.

In a preferred embodiment, the weight ratio of components B to C is 0.8:1 to 1.2:1.

In addition to components A, B and C, the composition may comprise as component D one or more polymer additives, fillers and reinforcers, dyes, pigments and/or polymers distinct from components A and B as blend partners, wherein the amount of component D is preferably 0.1% to 20% by weight, more preferably 0.2% to 15% by weight.

The proportions of components A to D are in each case based on the total composition.

The composition preferably consists to an extent of at least 90% by weight, more preferably to an extent of at least 95% by weight, of components A to D. It is particularly preferable when the composition consists only of components A to D.

The conductor spacing d1 thus depends on the operating voltage and is for example 1.3 to less than 2.5 mm in the range from 0 to 250 V inclusive.

The recited lower limits of the conductor spacings are only realizable when the thermoplastic material has a CTI of 600 V. For the recited upper limits, a CTI of at least 400 V is required. When the thermoplastic material has a CTI of 600 V, the distances d1 are preferably as follows $$d1(0 \text{ V} \leq U \leq 250 \text{ V}): 1.3 \text{ to } <1.8 \text{ mm}$$

$$d1(250 \text{ V} < U \leq 500 \text{ V}): 2.5 \text{ to } <3.6 \text{ mm}$$

$$d1(500 \text{ V} < U \leq 1000 \text{ V}): 5.0 \text{ to } <7.1 \text{ mm}.$$

It is preferable when d2 is least 1.2 mm, more preferably 1.2 to 10.0 mm, in the E/E component according to the invention. Those skilled in the art are capable of determining the distance at which sparkover through the air is prevented.

It is preferable when the E/E component is one that has an IP6K9K protection rating according to ISO 20653:2013-02, i.e. is shielded against contact and ingress of foreign bodies and water.

The E/E component according to the invention is preferably a part of a (high-)voltage switch or (high-)voltage inverter, relay, electronic connector, electrical connector, circuit breaker, a photovoltaic system, an electric motor, a heat sink, a USB plug, a charger or charging plug for electric vehicles, an electrical junction box, a smart meter housing, a miniature circuit breaker or a busbar. "Part of a" here means that this may be an individual element of a complex product, of a component group, but likewise that it may be the entire element, as is conceivable for example in the case of "electronic connectors".

The present invention also further provides an assembly configured for an operating voltage of at least 400 V, preferably of 600 V, containing the E/E component according to the invention, preferably an assembly that has an IP6K9K protection rating according to ISO 20653:2013-02.

The present invention further provides for the use of 5% to 15% by weight of a rubber-modified graft polymer having a graft substrate selected from the group consisting of acrylate rubbers, polybutadiene rubbers and styrene-butadiene block copolymer rubbers and a graft superstrate free from structural units derived from acrylonitrile and 5% to 15% by weight of at least one phosphorus-containing flame retardant for improving the CTI and the flame retardancy according to UL 94 V of aromatic polycarbonate compositions or aromatic polyester carbonate compositions.

Preference is given to a use, wherein a CTI of 600 V determined according to the rapid test method based on IEC 60112:2009 and a UL 94 classification at a test specimen thickness of 1.5 mm of at least V2 of polycarbonate compositions containing 50% to 85% by weight of aromatic polycarbonate or aromatic polyester carbonate is attained.

The features referred to as preferable and particularly preferable, etc. for the composition of the thermoplastic material also apply in respect of the use according to the invention.

Component A

Aromatic polycarbonates and/or aromatic polyester carbonates of component A which are suitable in accordance with the invention are known from the literature or producible by processes known from the literature (for production of aromatic polycarbonates, see, for example, Schnell, "Chemistry and Physics of Polycarbonates", Interscience Publishers, 1964, and also DE-AS 1 495 626, DE-A 2 232 877, DE-A 2 703 376, DE-A 2 714 544, DE-A 3 000 610, DE-A 3 832 396; for production of aromatic polyester carbonates, for example DE-A 3 007 934).

Aromatic polycarbonates are produced for example by reaction of diphenols with carbonyl halides, preferably phosgene and/or with aromatic dicarbonyl dihalides, preferably dihalides of benzenedicarboxylic acid, by the interfacial process, optionally using chain terminators, for example monophenols, and optionally using trifunctional or more than trifunctional branching agents, for example triphenols or tetraphenols. Another possibility is production by a melt polymerization process by reaction of diphenols with, for example, diphenyl carbonate.

Diphenols for producing the aromatic polycarbonates and/or aromatic polyester carbonates are preferably those of formula (1)

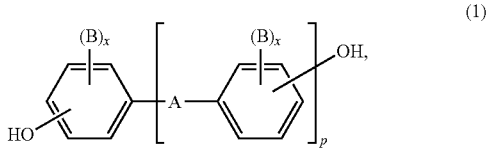

wherein
A is a single bond, $C_1$- to $C_5$-alkylene, $C_2$- to $C_5$-alkylidene, $C_5$- to $C_6$-cycloalkylidene, —O—, —SO—, —CO—, —S—, —SO$_2$—, $C_6$- to $C_{12}$-arylene, onto which further aromatic rings optionally containing heteroatoms may be fused,
or a radical of formula (2) or (3)

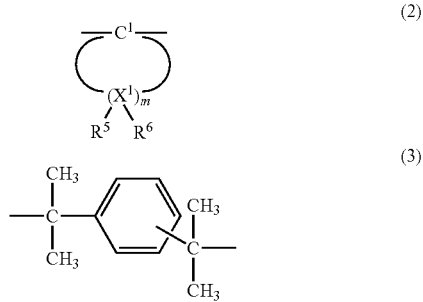

B is in each case $C_1$- to $C_{12}$-alkyl, preferably methyl, halogen, preferably chlorine and/or bromine,
x is in each case independently 0, 1 or 2,
p is 1 or 0, and
$R^5$ and $R^6$ are individually selectable for each $X^1$ and independently of one another hydrogen or $C_1$- to $C_6$-alkyl, preferably hydrogen, methyl or ethyl,
$X^1$ is carbon and
m is an integer from 4 to 7, preferably 4 or 5, with the proviso that, on at least one atom $X^1$, $R^5$ and $R^6$ are both alkyl.

Preferred diphenols are hydroquinone, resorcinol, dihydroxydiphenols, bis(hydroxyphenyl) $C_1$-$C_5$-alkanes, bis(hydroxyphenyl) $C_5$-$C_6$-cycloalkanes, bis(hydroxyphenyl) ethers, bis(hydroxyphenyl) sulfoxides, bis(hydroxyphenyl) ketones, bis(hydroxyphenyl) sulfones and α, α-bis(hydroxyphenyl)diisopropylbenzenes and also ring-brominated and/or ring-chlorinated derivatives thereof.

Particularly preferred diphenols are 4,4'-dihydroxybiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxydiphenyl sulfide, 4,4'-dihydroxydiphenyl sulfone, and also the di- and tetrabrominated or chlorinated derivatives thereof, for example 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane. Particular preference is given to 2,2-bis(4-hydroxyphenyl) propane (bisphenol A).

The diphenols may be used individually or in the form of any desired mixtures. The diphenols are known from the literature or obtainable by processes known from the literature.

Examples of chain terminators suitable for the production of the thermoplastic aromatic polycarbonates include phenol, p-chlorophenol, p-tert-butylphenol or 2,4,6-tribromophenol, but also long-chain alkylphenols, such as 4-[2-(2,4,4-trimethylpentyl)]phenol, 4-(1,3-tetramethylbutyl)phenol according to DE-A 2 842 005 or monoalkylphenol or dialkylphenols having a total of 8 to 20 carbon atoms in the alkyl substituents, such as 3,5-di-tert-butylphenol, p-isooctylphenol, p-tert-octylphenol, p-dodecylphenol and 2-(3,5-dimethylheptyl)phenol and 4-(3,5-dimethylheptyl)phenol. The amount of chain terminators to be used is generally between 0.5 mol % and 10 mol %, based on the molar sum of the diphenols used in each case.

The thermoplastic aromatic polycarbonates have average molecular weights (weight average $M_w$) of preferably 20 000 to 40 000 g/mol, further preferably 22 000 to 32 000 g/mol, particularly preferably 24 000 to 30 000 g/mol, measured by GPC (gel permeation chromatography) calibrated against bisphenol A polycarbonate standards using dichloromethane as eluent, calibration with linear polycarbonates (formed from bisphenol A and phosgene) of known molar mass distribution from PSS Polymer Standards Service GmbH, Germany, and calibration by method 2301-0257502-09D (2009 German-language edition) from Currenta GmbH & Co. OHG, Leverkusen. The eluent is dichloromethane. Column combination of crosslinked styrene-divinylbenzene resins. Diameter of analytical columns: 7.5 mm; length: 300 mm. Particle sizes of column material: 3 μm to 20 μm. Concentration of solutions: 0.2% by weight. Flow rate: 1.0 ml/min, temperature of solutions: 30° C. Use of UV and/or RI detection.

The preferred ranges result in a particularly advantageous balance of mechanical and rheological properties in the compositions of the invention.

The thermoplastic aromatic polycarbonates may be branched in a known manner, and preferably through incorporation of 0.05 to 2.0 mol %, based on the sum total of the diphenols used, of trifunctional or more than trifunctional compounds, for example those having three or more phenolic groups. It is preferable to employ linear polycarbonates, more preferably ones based on bisphenol A.

Both homopolycarbonates and copolycarbonates are suitable. Inventive copolycarbonates according to component A may also be produced using 1% to 25% by weight, preferably 2.5% to 25% by weight, based on the total amount of diphenols to be used, of polydiorganosiloxanes having hydroxyaryloxy end groups. These are known (U.S. Pat. No. 3,419,634) and can be produced by processes known from the literature. Polydiorganosiloxane-containing copolycarbonates are likewise suitable; production of the polydiorganosiloxane-containing copolycarbonates is described, for example, in DE-A 3 334 782.

Aromatic dicarbonyl dihalides for production of aromatic polyester carbonates are preferably the diacyl dichlorides of isophthalic acid, of terephthalic acid, of diphenyl ether 4,4'-dicarboxylic acid and of naphthalene-2,6-dicarboxylic acid.

Particular preference is given to mixtures of the diacyl dichlorides of isophthalic acid and terephthalic acid in a ratio of between 1:20 and 20:1.

Production of polyester carbonates additionally employs a carbonyl halide, preferably phosgene, as a bifunctional acid derivative.

Contemplated chain terminators for production of the aromatic polyester carbonates include not only the aforementioned monophenols but also their chlorocarbonic esters and the acyl chlorides of aromatic monocarboxylic acids, which may optionally be substituted by $C_1$- to $C_{22}$-alkyl groups or by halogen atoms, and aliphatic $C_2$- to $C_{22}$-monocarbonyl chlorides.

The amount of chain terminators is in each case 0.1 to 10 mol %, based on moles of diphenol in the case of phenolic chain terminators and on moles of dicarboxylic acid dichloride in the case of monocarboxylic acid chloride chain terminators.

In the production of aromatic polyester carbonates it is also possible to use one or more aromatic hydroxycarboxylic acids.

The aromatic polyester carbonates may be linear or they may be branched in a known manner (see DE-A 2 940 024 and DE-A 3 007 934), preference being given to linear polyester carbonates.

Branching agents used may for example be tri- or polyfunctional carboxylic acid chlorides, such as trimesyl trichloride, cyanuric trichloride, 3,3',4,4'-benzophenonetetracarboxylic acid tetrachloride, 1,4,5,8-naphthalenetetracarboxylic acid tetrachloride or pyromellitic tetrachloride, in amounts of 0.01 to 1.0 mol % (based on dicarboxylic acid dichlorides used), or tri- or polyfunctional phenols, such as phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)-ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl)methane, 2,6-bis(2-hydroxy-5-methylbenzyl)-4-methylphenol, 2-(4-hydroxyphenyl)-2-(2,4-dihydroxyphenyl) propane, tetra(4-[4-hydroxyphenylisopropyl]phenoxy) methane, 1,4-bis[4,4'-dihydroxytriphenyl)methyl]benzene, in amounts of 0.01 to 1.0 mol %, based on diphenols used. Phenolic branching agents may be initially charged with the diphenols; acid chloride branching agents may be introduced together with the acid dichlorides.

The proportion of carbonate structural units in the thermoplastic aromatic polyester carbonates may be varied as desired. It is preferable when the proportion of carbonate groups is up to 100 mol %, especially up to 80 mol %, particularly preferably up to 50 mol %, based on the sum of ester groups and carbonate groups. Both the ester fraction and the carbonate fraction of the aromatic polyester carbonates may be present in the form of blocks or in random distribution in the polycondensate.

The thermoplastic aromatic polycarbonates and polyester carbonates may be used alone or in any desired mixture.

Preferably, linear polycarbonate is employed as component A, more preferably linear polycarbonate based exclusively on bisphenol A.

Component B

Component B is at least one rubber-containing graft polymer of

B.1) 5% to 95% by weight, preferably 10% to 70% by weight, particularly preferably 20% to 60% by weight, based on component B, of a mixture of B.1.1) 65% to 85% by weight, preferably 70% to 80% by weight, based on B.1, of at least one monomer selected from the group of the vinylaromatics (for example styrene, α-methylstyrene), ring-substituted vinylaromatics (for example p-methylstyrene, p-chlorostyrene) and (C1-C8)-alkyl methacrylates (for example methyl methacrylate, ethyl methacrylate)

and

B.1.2) 15% to 35% by weight, preferably 20% to 30% by weight, based on B.1, of at least one monomer selected from the group of (C1-C8)-alkyl (meth)acrylates (for example methyl methacrylate, n-butyl acrylate, tert-butyl acrylate) and derivatives (for example anhydrides and imides) of unsaturated carboxylic acids (for example maleic anhydride and N-phenylmaleimide)

on

B.2) 95% to 5% by weight, preferably 90% to 30% by weight, particularly preferably 80% to 40% by weight, based on component B, of one or more elastomeric graft substrates selected from the group consisting of acrylate rubber and diene rubber.

The graft substrate preferably has a glass transition temperature <0° C., more preferably <−20° C., particularly preferably <−40° C.

Component B.1 is also referred to as a graft superstrate or graft shell and is free from acrylonitrile.

Unless expressly stated otherwise in the present application, the glass transition temperature is determined for all components by differential scanning calorimetry (DSC) according to DIN EN 61006 (1994 version) at a heating rate of 10 K/min with determination of Tg as the midpoint temperature (tangent method).

The graft particles in component B1 preferably have a median particle size (D50) of 0.05 to 5 µm, preferably of 0.1 to 1.0 µm, particularly preferably of 0.2 to 0.5 µm.

The median particle size D50 is the diameter with 50% by weight of the particles above it and 50% by weight below it. Unless expressly stated otherwise in the present application, it is determined by means of ultracentrifuge measurement (W. Scholtan, H. Lange, Kolloid, Z. und Z. Polymere 250 (1972), 782-796).

Preferred diene rubbers as graft substrates B.2 are those containing butadiene or copolymers of dienes, preferably containing butadiene, and further copolymerizable vinyl monomers (for example according to B.1.1 and B.1.2) or mixtures of one or more of the aforementioned components.

A further preferred diene rubber is pure polybutadiene rubber. In a further preferred embodiment, B.2 is styrene-butadiene rubber, particularly preferably styrene-butadiene block copolymer rubber.

Preferred monomers B.1.1 are selected from at least one of the monomers styrene, α-methylstyrene and methyl methacrylate; preferred monomers B.1.2 are selected from at least one of the monomers maleic anhydride and methyl methacrylate.

Particularly preferred monomers are B.1.1 styrene and B.1.2 methyl methacrylate. It is equally preferable when both B.1.1 and B.1.2 are methyl methacrylate.

Preferred graft copolymers comprising diene rubbers as the graft substrate are graft copolymers where methyl methacrylate or a mixture of methyl methacrylate and styrene are grafted onto a graft substrate based on 1,3-butadiene or onto a graft substrate composed of a mixture of 1,3-butadiene and styrene, wherein these are also referred to as MBS (methyl methacrylate-butadiene-styrene) rubbers.

Elastomeric acrylate rubber graft substrates B.2 suitable for the graft polymers B are preferably polymers of alkyl acrylates, optionally with up to 40% by weight, based on B.2, of other polymerizable ethylenically unsaturated monomers. Preferred polymerizable acrylic esters include $C_1$- to $C_8$-alkyl esters, for example methyl, ethyl, butyl, n-octyl and 2-ethylhexyl esters; haloalkyl esters, preferably halo-$C_1$-$C_8$-alkyl esters, such as chloroethyl acrylate and also mixtures of these monomers.

Crosslinking may be achieved by copolymerizing monomers comprising more than one polymerizable double bond. Preferred examples of crosslinking monomers are esters of unsaturated monocarboxylic acids having 3 to 8 carbon atoms and unsaturated monohydric alcohols having 3 to 12 carbon atoms or saturated polyols having 2 to 4 OH groups and 2 to 20 carbon atoms, such as ethylene glycol dimethacrylate and allyl methacrylate; polyunsaturated heterocyclic compounds, such as trivinyl and triallyl cyanurate; polyfunctional vinyl compounds, such as di- and trivinylbenzenes; but also triallyl phosphate and diallyl phthalate. Preferred crosslinking monomers are allyl methacrylate, ethylene glycol dimethacrylate, diallyl phthalate and heterocyclic compounds having at least three ethylenically unsaturated groups. Particularly preferred crosslinking monomers are the cyclic monomers triallyl cyanurate, triallyl isocyanurate, triacryloylhexahydro-s-triazine, and triallylbenzenes. The amount of the crosslinked monomers is preferably 0.02% to 5% by weight, especially 0.05% to 2% by weight, based on the graft substrate B.2. In the case of cyclic crosslinking monomers having at least three ethylenically unsaturated groups, it is advantageous to limit the amount to below 1% by weight of the graft substrate B.2.

The gel content of the graft polymers is at least 40% by weight, preferably at least 60% by weight, particularly preferably at least 75% by weight (measured in acetone).

The gel content of the graft polymers, unless otherwise stated in the present invention, is determined at 25° C. as the insoluble fraction in acetone as the solvent (M. Hoffmann, H. Krömer, R. Kuhn, Polymeranalytik I und II, Georg Thieme-Verlag, Stuttgart 1977).

The graft copolymers B are generally produced by free-radical polymerization.

Particularly preferred polymers B are for example polymers produced by emulsion polymerization as described, for example, in Ullmanns Enzyklopädie der Technischen Chemie, vol. 19 (1980), p. 280 ff.

On conclusion of the polymerization reaction, the graft polymers are precipitated out of the aqueous phase, followed by an optional wash with water. The last workup step is a drying step.

The graft polymer B generally also comprises as a consequence of manufacture free copolymer, i.e. copolymer of B.1.1 and B.1.2 which is not chemically bonded to the rubber substrate and has the feature that it is dissolvable in suitable solvents (e.g. acetone).

Component B1 preferably contains a free copolymer of B.1.1 and B.1.2 having a weight-average molecular weight (Mw) determined by gel permeation chromatography with a polystyrene standard of preferably 30 000 to 200 000 g/mol, particularly preferably of 40 000 to 150 000 g/mol.

Component C

Component C employed in the composition according to the invention is a phosphorus-containing flame retardant, preferably selected from the groups of mono- and oligomeric phosphoric and phosphonic esters and phosphazenes, it also being possible to use mixtures of several compounds selected from one or more of these groups as flame retardants.

Preferred mono- and oligomeric phosphoric and phosphonic esters are phosphorus compounds of general formula (4)

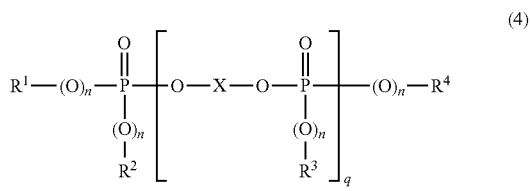

wherein
$R^1$, $R^2$, $R^3$ and $R^4$ are each independently optionally halogenated $C_1$- to $C_8$-alkyl, in each case optionally alkyl-substituted, preferably $C_1$- to $C_4$-alkyl-substituted, and/or halogen-substituted, preferably chlorine- or bromine-substituted, $C_5$- to $C_6$-cycloalkyl, $C_6$- to $C_{20}$-aryl or $C_7$- to $C_{12}$-aralkyl,
n is independently 0 or 1,
q is 0 to 30 and
X is a mono- or polycyclic aromatic radical having 6 to 30 carbon atoms, or a linear or branched aliphatic radical having 2 to 30 carbon atoms, which may be OH-substituted and may contain up to 8 ether bonds.

Preferably, $R^1$, $R^2$, $R^3$ and $R^4$ are independently $C_1$- to $C_4$-alkyl, phenyl, naphthyl or phenyl-$C_1$-$C_4$-alkyl. The aromatic $R^1$, $R^2$, $R^3$ and $R^4$ groups may in turn be substituted by halogen and/or alkyl groups, preferably chlorine, bromine and/or $C_1$- to $C_4$-alkyl. Particularly preferred aryl radicals are cresyl, phenyl, xylenyl, propylphenyl or butylphenyl, and the corresponding brominated and chlorinated derivatives thereof.

X in formula (4) is preferably a mono- or polycyclic aromatic radical having 6 to 30 carbon atoms. The latter is preferably derived from diphenols.

n in formula (4) may independently be 0 or 1; preferably n is 1.

q has values of 0 to 30. When mixtures of different components of formula (4) are used, it is possible to use mixtures having preferably number-average q values of 0.3 to 10, particularly preferably 0.5 to 10, in particular 1.05 to 1.4, most preferably 1.05 to 1.2.

X is particularly preferably

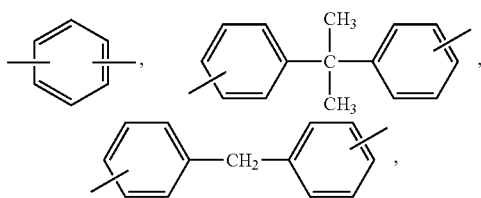

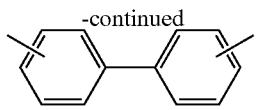

or the chlorinated or brominated derivatives thereof; in particular, X is derived from resorcinol, hydroquinone, bisphenol A or diphenylphenol. Particularly preferably, X is derived from bisphenol A.

Monophosphates (q=0), oligophosphates (q=1-30) or mixtures of mono- and oligophosphates may be used as component C according to the invention.

Monophosphorus compounds of formula (1) are especially tributyl phosphate, tris(2-chloroethyl) phosphate, tris (2,3-dibromopropyl) phosphate, tri(2-ethylhexyl) phosphate, triphenyl phosphate, tricresyl phosphate, diphenyl cresyl phosphate, diphenyl octyl phosphate, diphenyl 2-ethylcresyl phosphate, tri(isopropylphenyl) phosphate, halogen-substituted aryl phosphates, dimethyl methylphosphonate, diphenyl methylphosphonate, diethyl phenylphosphonate, triphenylphosphine oxide or tricresylphosphine oxide.

One particularly preferred phosphorus compound according to component C is bisphenol A-based oligophosphate of formula (5).

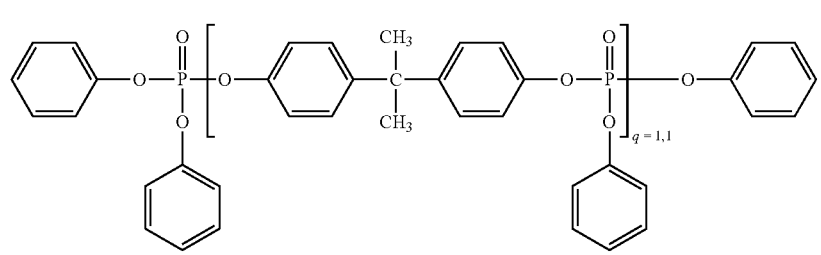

The phosphorus compounds of formula (4) are known (cf. EP-A 363 608, EP-A 640 655 for example) or may be produced by known methods in analogous fashion (for example Ullmanns Enzyklopädie der technischen Chemie, vol. 18, p. 301 ff. 1979; Houben-Weyl, Methoden der organischen Chemie, vol. 12/1, p. 43; Beilstein vol. 6, p. 177).

The average q values can be determined by using a suitable method (gas chromatography (GC), high pressure liquid chromatography (HPLC), gel permeation chromatography (GPC)) to determine the composition of the phosphate mixture (molecular weight distribution) and using this to calculate the average values for q.

Phosphazenes are compounds of formulae (6) and (7)

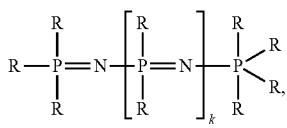

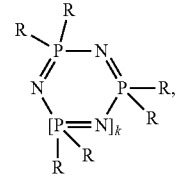

wherein
R in each case is identical or different and is amino, in each case optionally halogenated, preferably fluorine-halogenated, $C_1$- to $C_8$-alkyl, or $C_1$- to $C_8$-alkoxy, in each case optionally alkyl-substituted, preferably $C_1$- to $C_4$-alkyl-substituted, and/or halogen-substituted, preferably chlorine- and/or bromine-substituted, $C_5$- to $C_6$-cycloalkyl, $C_6$- to $C_{20}$-aryl, preferably phenyl or naphthyl, $C_6$- to $C_{20}$-aryloxy, preferably phenoxy, naphthyloxy, or $C_7$- to $C_{12}$-aralkyl, preferably phenyl-$C_1$-$C_4$-alkyl, k is 0 or a number from 1 to 15, preferably a number from 1 to 10.

Examples include propoxyphosphazene, phenoxyphosphazene, methylphenoxyphosphazene, aminophosphazene and fluoroalkylphosphazenes. Phenoxyphosphazene is preferred.

The phosphazenes can be used alone or in a mixture. The R radical may always be the same, or two or more radicals in formulae (6) and (7) may be different. Phosphazenes and the production thereof are described for example in EP-A 728 811, DE-A 1 961668 and WO 97/40092.

It is preferable to employ as component C a flame retardant of formula (4), particularly preferably of formula (5).

Component D

One or more representatives selected from the group consisting of polymer additives and polymeric blend partners may optionally be present in the composition as component D.

The polymer additives or polymeric blend partners are preferably selected from the group consisting of anti-drip agents, flame retardant synergists, smoke inhibitors, lubricants and mold-release agents, nucleating agents, antistats, conductivity additives, stabilizers, flow promoters, fillers and reinforcers, phase compatibilizers, further polymeric constituents distinct from components A and B and dyes and pigments.

In a preferred embodiment, at least one polymer additive selected from the group consisting of lubricants and mold-release agents and stabilizers is used as component D.

In a preferred embodiment, at least one representative selected from the group consisting of sterically hindered phenols, organic phosphites, phosphorous acid and organic or inorganic Brønsted acids is used as stabilizer.

In a preferred embodiment, fatty acid esters, particularly preferably fatty acid esters of pentaerythritol or glycerol, are used as lubricants and mold-release agents.

The amount and the type of components D must of course be selected such that the flame retardancy and the CTI are not significantly impaired.

Production of the Thermoplastic Material from the Composition

The thermoplastic material M may be produced from the composition containing the inventive components A, B and C and optionally D.

The thermoplastic material M may be produced for example by mixing the respective constituents of the composition in a known manner and melt-compounding and melt-extruding the mixture at temperatures of preferably 200° C. to 320° C., particularly preferably at 240° C. to 300° C., very particularly preferably at 260° C. to 290° C., in customary apparatuses such as internal kneaders, extruders and twin-screw extruders.

In the context of the present application, this process is generally referred to as compounding.

Thermoplastic material M is thus understood as meaning the product obtained when the constituents of the composition are melt-compounded and melt-extruded.

The mixing of the individual constituents of the composition may be carried out in a known manner, either successively or simultaneously, either at about 20° C. (room temperature) or at a higher temperature. This means that, for example, some of the constituents may be introduced via the main intake of an extruder and the remaining constituents may be introduced later in the compounding process via a side extruder.

Producing the E/E Component According to the Invention

A component according to the invention may for example be produced by injection molding with overmolding of metallic conductor tracks. Metallic conductor tracks are fixed preassembled in the cavity of the injection molding tool. After the tool is closed, the conductor tracks are flooded with polymer melt under high pressure, this creating a composite when cooled. After solidifying and demolding, the finished component can be used.

An alternative is integrated plastic-metal injection molding (IKMS). This involves producing the finished component in two steps. In the first step, the plastic component with the conductor tracks that will be filled subsequently is produced. The finished plastic component is then placed in a second cavity and filled with solder, this constituting the conductor tracks when solidified.

A further alternative is the subsequent connection of an injection-molded component to the conductor tracks, i.e. the plastic component is produced in the injection mold and assembled with the conductor in a further step. The injection-molded component can be connected during assembly via a further input of energy. There are multiple methods for this; for instance, the metallic conductor can be heated so strongly that it can be pressed into the plastic component. The conductor can however also be connected directly to the plastic component by means of laser welding.

The component is preferably a part of a (high-)voltage switch, (high-)voltage inverter, relay, electronic connector, electrical connector, circuit breaker, a photovoltaic system, an electric motor, a heat sink, a USB plug, a charger or charging plug for electric vehicles, an electrical junction box, a smart meter housing, a miniature circuit breaker or a busbar. It is likewise possible for the component to be the entire element and not only a part thereof.

Further embodiments of the present invention are listed below.

1. E/E component comprising a first electrical conductor $L1$ and a second electrical conductor $L2$ at a first distance $d1$ and a second distance $d2$ to one another, which are connected via a thermoplastic material M which is in direct contact with the first electrical conductor and the second electrical conductor, wherein the distance $d1$ is the shortest distance between the first electrical conductor and the second electrical conductor along the surface of the thermoplastic material M and wherein the distance $d2$ is the shortest distance between the first electrical conductor and the second electrical conductor through the air, wherein $d2$ is selected in such a way that at the respective operating voltage U for the component a sparkover through the air is prevented, wherein $d1$, at the operating voltage U listed below, has the following values:

$d1(0\ V \leq U \leq 250\ V)$: 1.3 mm to <2.5 mm $d1(250\ V < U \leq 500\ V)$: 2.5 mm to <5.0 mm $d1(500\ V < U \leq 1000\ V)$: 5.0 mm to <10.0 mm and wherein the thermoplastic material M comprises the following components:

A) at least one aromatic polycarbonate, aromatic polyester carbonate or mixtures thereof, B) at least 5% by weight of at least one rubber-modified graft polymer having a graft substrate selected from the group consisting of acrylate rubbers, polybutadiene rubbers and styrene-butadiene block copolymer rubbers and a graft superstrate free from structural units derived from acrylonitrile C) at least 5% by weight of at least one phosphorus-containing flame retardant.

2. E/E component according to embodiment 1, wherein the thermoplastic material M comprises the following components:

A) 50% to 85% by weight of at least one aromatic polycarbonate, aromatic polyester carbonate or mixtures thereof, B) 5% to 15% by weight of a rubber-modified graft polymer having a graft substrate selected from the group consisting of acrylate rubbers, polybutadiene rubbers and styrene-butadiene block copolymer rubbers and a graft superstrate free from structural units derived from acrylonitrile C) 5% to 15% by weight of at least one phosphorus-containing flame retardant.

3. E/E component according to either of the preceding embodiments, wherein component A is bisphenol A-based homopolycarbonate.

4. E/E component according to any of the preceding embodiments, wherein component C is selected from the group consisting of mono- and oligomeric phosphoric and phosphonic esters, phosphazenes and mixtures of these compounds.

5. E/E component according to any of the preceding embodiments, wherein component C employed is a compound of general formula (4)

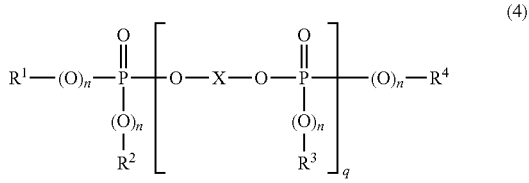

(4)

wherein

R¹, R², R³ and R⁴ are each independently optionally halogenated C1- to C8-alkyl, in each case optionally alkyl-substituted, preferably C1- to C4-alkyl-substituted, and/or halogen-substituted, preferably chlorine- or bromine-substituted, C5- to C6-cycloalkyl, C6- to C20-aryl or C7- to C12-aralkyl, n is independently 0 or 1, q is 0 to 30 and X is a mono- or polycyclic aromatic radical having 6 to 30 carbon atoms, or a linear or branched aliphatic radical having 2 to 30 carbon atoms, which may be OH-substituted and may contain up to 8 ether bonds.

6. E/E component according to any of the preceding embodiments, wherein the thermoplastic material comprises 65% to 80% by weight of component A, 6% to 12% by weight of component B and 6% to 12% by weight of component C.

7. E/E component according to any of the preceding embodiments, wherein the weight ratio of components B to C is 0.8:1 to 1.2:1.

8. E/E component according to any of the preceding embodiments, wherein the thermoplastic material M further comprises as component D 0.1% to 20% by weight of one or more polymer additives, fillers and reinforcers, dyes, pigments and/or polymers distinct from components A and B as blend partners.

9. E/E component according to embodiment 8, wherein the proportion of component D is 0.2% to 15% by weight.

10. E/E component according to any of the preceding embodiments, wherein the thermoplastic material consists of components A to D.

11. E/E component according to any of the preceding embodiments, wherein d1 exhibits the following values at the operating voltages U listed below:
d1(0 V<U≤250 V): 1.3 to <1.8 mm
d1(250 V<U≤500 V): 2.5 to <3.6 mm
d1(500 V<U≤1000 V): 5.0 to <7.1 mm.

12. E/E component according to any of the preceding embodiments, wherein d2≥1.2 mm.

13. E/E component according to any of the preceding embodiments, wherein d2 is 1.2 to 10.0 mm.

14. E/E component according to any of the preceding embodiments, wherein said component is a part of a (high-)voltage switch, (high-)voltage inverter, relay, electronic connector, electrical connector, circuit breaker, a photovoltaic system, an electric motor, a heat sink, a USB plug, a charger or charging plug for electric vehicles, an electrical junction box, a smart meter housing, a miniature circuit breaker or a busbar.

15. EE component according to any of the preceding embodiments, wherein the thermoplastic material M has a CTI of 600 V determined based on IEC 60112:2009.

16. EE assembly comprising an EE component according to any of the preceding embodiments, wherein the EE assembly has an IP6K9K protection rating according to ISO 20653:2013-02.

17. EE assembly according to embodiment 16, wherein the operating voltage of the EE assembly is at least 400 V.

18. Use of 5% to 15% by weight of a rubber-modified graft polymer having a graft substrate selected from the group consisting of acrylate rubbers, polybutadiene rubbers and styrene-butadiene block copolymer rubbers and a graft superstrate free from structural units derived from acrylonitrile and 5% to 15% by weight of at least one phosphorus-containing flame retardant for improving the CTI and the flame retardancy according to UL 94 V of aromatic polycarbonate compositions or aromatic polyester carbonate compositions.

19. Use according to embodiment 18, wherein a CTI of 600 V determined according to the rapid test method based on IEC 60112:2009 and a UL 94 V2 classification at a test specimen thickness of 1.5 mm of polycarbonate compositions containing 50% to 85% by weight of aromatic polycarbonate or aromatic polyester carbonate is attained.

EXAMPLES

Component A-1:

Linear polycarbonate based on bisphenol A having a weight-average molecular weight $M_W$ of 26 000 g/mol (determined by GPC in methylene chloride with polycarbonate based on bisphenol A as standard).

Component A-2:

Linear polycarbonate based on bisphenol A having a weight-average molecular weight $M_W$ of 20 000 g/mol (determined by GPC in methylene chloride with polycarbonate based on bisphenol A as standard).

Component B-1

Graft polymer composed of 23% by weight of methyl methacrylate and 6% by weight of styrene on 71% by weight of polybutadiene rubber as the graft substrate, produced by emulsion polymerization, Kane Ace™ M732, Kaneka, Japan Component B-2

Graft polymer of 40 parts by weight of methyl methacrylate on 60 parts by weight of poly-n-butyl acrylate rubber as the graft substrate (median particle diameter d50=0.50 μm), produced by emulsion polymerization, Paraloid™ EXL-2300 (Dow, USA)

Component B-3

Graft polymer of 43 parts by weight of a copolymer of styrene and acrylonitrile in a weight ratio of 73:27 on 57 parts by weight of a particulate crosslinked polybutadiene rubber as the graft substrate, produced by emulsion polymerization.

Component C

Bisphenol A-based oligophosphate according to the following structure (Chemtura Manufacturing UK Limited)

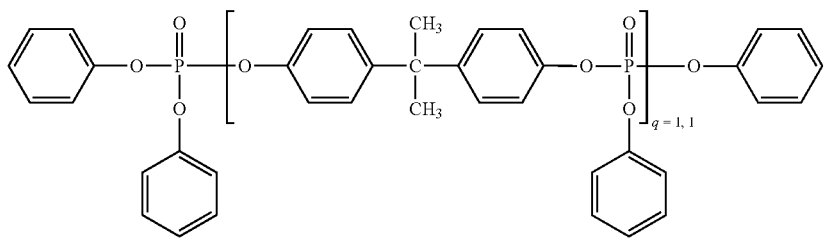

Component D-1
Pentaerythritol tetrastearate, Loxiol™ P 861/3.5 Special (Emery Oleochemicals GmbH, Düsseldorf, Germany).

Component D-2
Irganox™ B900 (mixture of 80% Irgafos™ 168 (tris(2,4-di-tert-butylphenyl) phosphite) and 20% Irganox™ 1076 (2,6-di-tert-butyl-4-(octadecanoxycarbonylethyl)phenol); BASF (Ludwigshafen, Germany).

Component D-3
ADS5000: Polytetrafluoroethylene (PTFE) preparation from IRPC Public Company Limited, Thailand consisting of 50% by weight of PTFE present in a SAN copolymer matrix.

Production and Testing of the Molding Compounds Made from the Compositions

The components were mixed in a ZSK-26 Mc18 twin-screw extruder from Coperion at a melt temperature of 250° C.-280° C. The shaped articles were produced at a melt temperature of 260° C. and a mold temperature of 70° C. in an Arburg 270 E injection molding machine.

The IZOD notched impact strength was determined at room temperature on test rods having dimensions of 80 mm×10 mm×4 mm according to ISO 180/1A (2019 version).

The Vicat softening temperature was measured according to DIN ISO 306 (Method B with 50 N load and a heating rate of 120 K/h, 2013 version) on a test rod which had been injection-molded on one side and with dimensions of 80×10×4 mm.

The flame retardancy was assessed according to UL94V on rods with dimensions of 127×12.7×1.5 mm.

The tracking resistance ("comparative tracking index", CTI) was tested for the compositions described here according to the rapid test method based on IEC 60112:2009. To this end, a 0.1% ammonium chloride test solution (395 ohm*cm resistance) was applied dropwise, between two neighboring electrodes spaced apart by 4 mm, to the surface of test specimens of dimensions 60 mm×40 mm×4 mm at a time interval of 30 s. A test voltage was applied between the electrodes and was varied over the course of the test. The first test specimen was tested at a starting voltage of 300 V or 350 V. A maximum of 50 drops (one drop every 30 s) in total were applied per voltage provided there was no tracking current of >0.5 A over 2 s or combustion of the sample. After 50 drops, the voltage was increased by 50 V and a new test specimen was tested at this higher voltage, according to the procedure described above. This process was continued until either 600 V was reached or a tracking current or combustion occurred. If one of the above-mentioned effects already occurred with fewer than 50 drops, the voltage was reduced by 25 V and a new test specimen was tested at this lower voltage. The voltage was reduced until the test was passed with 50 drops without tracking current or combustion. This procedure was therefore used to determine the maximum possible voltage at which a composition was able to withstand 50 drops of the test solution without occurrence of a tracking current. Lastly, four further test specimens were tested at the determined maximum voltage with 50 drops each for confirmation. This confirmed value is reported as the CTI in the examples. A 100-drop value was not determined, hence "rapid test method based on" the specified standard.

The PTI ("proof tracking index") was tested based on IEC 60112:2009, modified as described below. To this end, a 0.1% ammonium chloride test solution (395 ohm*cm resistance) was applied dropwise, between two neighboring electrodes spaced apart by 4 mm, to the surface of test specimens of dimensions 60 mm×40 mm×4 mm at a time interval of 30 s. In contrast to the CTI testing, in the PTI testing a fixed test voltage was applied between the electrodes and a total of 5 test specimens were tested at the respective voltage. A maximum of 50 drops (one drop every 30 s) in total were applied per test specimen provided there was no tracking current of >0.5 A over 2 s or combustion of the sample. The test is considered to have been passed at the respectively specified voltage if a tracking current of >0.5 A over 2 s for any of the test specimens tested or combustion of the sample does not occur. The test is considered to have been failed in the case of a tracking current of >0.5 A over 2 s or combustion of the sample.

TABLE 1

| | Results | | | | | | |
|---|---|---|---|---|---|---|---|
| | V1 | V2 | V3 | V4 | 5 | 6 | 7 |
| Components [% by weight] | | | | | | | |
| A-1 | 79.2 | 77.2 | 75.9 | 73.2 | 69.2 | 65.2 | 61.2 |
| A-2 | 17.5 | 17.5 | 17.5 | 17.5 | 17.5 | 17.5 | 17.5 |
| B-1 | 1 | 2 | 2.6 | 4 | 6 | 8 | 10 |
| C | 1 | 2 | 2.7 | 4 | 6 | 8 | 10 |

TABLE 1-continued

| | Results | | | | | | |
|---|---|---|---|---|---|---|---|
| | V1 | V2 | V3 | V4 | 5 | 6 | 7 |
| D-1 (PETS) | 0.4 | 0.4 | 0.4 | 0.4 | 0.4 | 0.4 | 0.4 |
| D-2 (Irganox B900) | 0.1 | 0.1 | 0.1 | 0.1 | 0.1 | 0.1 | 0.1 |
| D-3 (ADS 5000) | 0.8 | 0.8 | 0.8 | 0.8 | 0.8 | 0.8 | 0.8 |
| Properties | | | | | | | |
| Tracking resistance CTI [V] | 600 | 600 | 600 | 600 | 600 | 600 | 600 |
| PTI 300 V | p | p | p | p | p | p | p |
| PTI 350 V | f | p | p | p | p | p | p |
| Izod notched impact strength [kJ/m$^2$] | 14 | 19 | 47 | 49 | 50 | 48 | 45 |
| Flame retardancy according to UL94 V at 1.5 mm | V0 | f | f | f | V0 | V0 | V1 |
| Vicat softening temperature [° C.] | 138 | 134 | 132 | 128 | 121 | 115 | 108 |

"p" means passed
"f" means failed

The data from Table 1 show that both high tracking resistance (CTI and PTI) and good flame retardancy are achieved only with the inventive compositions 5, 6 and 7. In addition, the Izod impact strength and the Vicat softening temperature achieve the desired values. If the proportions of components B-1 and C are too low, the flame retardancy is not achieved, the Izod notched impact strength is low or the tracking resistance is inadequate (V1, V2, V3 and V4).

TABLE 2

| | Results | | | | | | |
|---|---|---|---|---|---|---|---|
| | V8 | V9 | V10 | V11 | 12 | 13 | 14 |
| Components [% by weight] | | | | | | | |
| A-1 | 79.2 | 77.2 | 75.9 | 73.2 | 69.2 | 65.2 | 61.2 |
| A-2 | 17.5 | 17.5 | 17.5 | 17.5 | 17.5 | 17.5 | 17.5 |
| B-2 | 1 | 2 | 2.6 | 4 | 6 | 8 | 10 |
| C | 1 | 2 | 2.7 | 4 | 6 | 8 | 10 |
| D-1 (PETS) | 0.4 | 0.4 | 0.4 | 0.4 | 0.4 | 0.4 | 0.4 |
| D-2 (Irganox B900) | 0.1 | 0.1 | 0.1 | 0.1 | 0.1 | 0.1 | 0.1 |
| D-3 (ADS 5000) | 0.8 | 0.8 | 0.8 | 0.8 | 0.8 | 0.8 | 0.8 |
| Properties | | | | | | | |
| Tracking resistance CTI [V] | 250 | 600 | 250 | 600 | 600 | 600 | 600 |
| PTI 300 V | f | f | f | p | p | p | p |
| PTI 350 V | f | p | f | f | p | p | p |
| Izod notched impact strength [kJ/m$^2$] | 13 | 20 | 41 | 55 | 55 | 55 | 55 |
| Flame retardancy according to UL94 V at 1.5 mm | V0 | V0 | V0 | V2 | V2 | V1 | V0 |
| Vicat softening temperature [° C.] | 138 | 135 | 132 | 128 | 121 | 114 | 108 |

"p" means passed
"f" means failed

The data from Table 2 show that with component B-2 too, compositions having the desired properties are achieved only with the inventive proportions of components B-2 and C. In the case of excessively low proportions, the tracking resistance (CTI and/or PTI) is inadequate (V8, V9, V10 and V11). Furthermore, the Izod notched impact strength does not achieve the desired minimum value (V8 and V9).

TABLE 3

| | Results | | | | | |
|---|---|---|---|---|---|---|
| | V15 | V16 | V17 | V18 | V19 | V20 |
| Components [% by weight] | | | | | | |
| A-1 | 79.2 | 77.2 | 75.9 | 73.2 | 69.2 | 61.2 |
| A-2 | 17.5 | 17.5 | 17.5 | 17.5 | 17.5 | 17.5 |
| B-3 | 1 | 2 | 2.6 | 4 | 6 | 10 |

TABLE 3-continued

| | Results | | | | | |
|---|---|---|---|---|---|---|
| | V15 | V16 | V17 | V18 | V19 | V20 |
| C | 1 | 2 | 2.7 | 4 | 6 | 10 |
| D-1 (PETS) | 0.4 | 0.4 | 0.4 | 0.4 | 0.4 | 0.4 |
| D-2 (Irganox B900) | 0.1 | 0.1 | 0.1 | 0.1 | 0.1 | 0.1 |
| D-3 (ADS 5000) | 0.8 | 0.8 | 0.8 | 0.8 | 0.8 | 0.8 |

TABLE 3-continued

| Results | | | | | | |
|---|---|---|---|---|---|---|
| | V15 | V16 | V17 | V18 | V19 | V20 |
| Properties | | | | | | |
| Tracking resistance CTI [V] | 600 | 600 | 300 | 600 | 600 | 300 |
| PTI 300 V | p | p | p | p | f | p |
| PTI 350 V | f | p | f | f | f | f |
| Izod notched impact strength [kJ/m²] | 12 | 21 | 51 | 54 | 57 | 54 |
| Flame retardancy according to UL94 V at 1.5 mm | V0 | V0 | V0 | V0 | V0 | V0 |
| Vicat softening temperature [° C.] | 138 | 134 | 132 | 128 | 121 | 108 |

"p" means passed
"f" means failed

The data from Table 3 show that with the exception of V16 the use of the noninventive component B-3 does not achieve a satisfactory tracking resistance (PTI), even when used in proportions sufficient for components B-1 or B-2. In the case of a small amount of component B-3, the Izod notched impact strength is also very low (V15 and V16).

The invention claimed is:

1. An E/E component comprising
    a first electrical conductor L1 and a second electrical conductor L2 at a first distance d1 and a second distance d2 to one another,
    which are connected via a thermoplastic material M which is in direct contact with the first electrical conductor and the second electrical conductor,
    wherein the distance d1 is the shortest distance between the first electrical conductor and the second electrical conductor along the surface of the thermoplastic material M and
    wherein the distance d2 is the shortest distance between the first electrical conductor and the second electrical conductor through the air,
    wherein d2 is selected in such a way that at the respective operating voltage U for the component a sparkover through the air is prevented,
    wherein d1, at the operating voltage U listed below, has the following values:
    d1 (0 V≤U≤250 V): 1.3 mm to <2.5 mm
    d1 (250 V<U≤500 V): 2.5 mm to <5.0 mm
    d1 (500 V<U≤1000 V): 5.0 mm to <10.0 mm
    and wherein the thermoplastic material M comprises the following components:
    A) at least one aromatic polycarbonate, aromatic polyester carbonate or mixtures thereof,
    B) at least 5% by weight of at least one rubber-modified graft polymer having a graft substrate selected from the group consisting of acrylate rubbers, polybutadiene rubbers and styrene-butadiene block copolymer rubbers
    and a graft superstrate free from structural units derived from acrylonitrile
    C) at least 5% by weight of at least one phosphorus-containing flame retardant.

2. The E/E component as claimed in claim 1, wherein the thermoplastic material M comprises the following components:
    A) 50% to 85% by weight of at least one aromatic polycarbonate, aromatic polyester carbonate or mixtures thereof,
    B) 5% to 15% by weight of a rubber-modified graft polymer having a graft substrate selected from the group consisting of acrylate rubbers, polybutadiene rubbers and styrene-butadiene block copolymer rubbers and a graft superstrate free from structural units derived from acrylonitrile
    C) 5% to 15% by weight of at least one phosphorus-containing flame retardant.

3. The E/E component as claimed in claim 1, wherein component A is bisphenol A-based homopolycarbonate.

4. The E/E component as claimed in claim 1, wherein component C is selected from the group consisting of mono- and oligomeric phosphoric and phosphonic esters, phosphazenes and mixtures of these compounds.

5. The E/E component as claimed in claim 1, wherein component C employed is a compound of general formula (4)

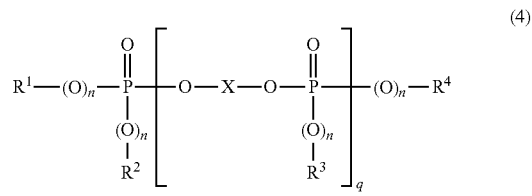

wherein
    $R^1$, $R^2$, $R^3$ and $R^4$ are each independently optionally halogenated C1 to C8-alkyl, in each case optionally alkyl-substituted, preferably C1 to C4-alkyl-substituted, and/or halogen-substituted, preferably chlorine- or bromine-substituted, C5 to C6-cycloalkyl, C6 to C20-aryl or C7 to C12-aralkyl,
    n is independently 0 or 1,
    q is 0 to 30 and
    X is a mono- or polycyclic aromatic radical having 6 to 30 carbon atoms, or a linear or branched aliphatic radical having 2 to 30 carbon atoms, which may be OH-substituted and may contain up to 8 ether bonds.

6. The E/E component as claimed in claim 1, wherein the thermoplastic material M further comprises as component D 0.1% to 20% by weight of one or more polymer additives, fillers and reinforcers, dyes, pigments and/or polymers distinct from components A and B as blend partners.

7. The E/E component as claimed in claim 1, wherein d1 exhibits the following values at the operating voltages U listed below:
    d1 (0 V≤U≤250 V): 1.3 to <1.8 mm
    d1 (250V<U≤500V): 2.5 to <3.6 mm
    d1 (500V<U≤1000V): 5.0 to <7.1 mm.

8. The E/E component as claimed in claim 1, wherein d2 ≥1.2 mm.

9. The E/E component as claimed in claim 1, wherein d2 is 1.2 to 10.0 mm.

10. The E/E component as claimed in claim 1, wherein said component is a part of a (high-) voltage switch, (high-) voltage inverter, relay, electronic connector, electrical connector, circuit breaker, a photovoltaic system, an electric motor, a heat sink, a USB plug, a charger or charging plug for electric vehicles, an electrical junction box, a smart meter housing, a miniature circuit breaker or a busbar.

11. The EE component as claimed in claim 1, wherein the thermoplastic material M has a CTI of 600 V determined based on IEC 60112:2009 as described in the examples section.

12. An EE assembly comprising an EE component as claimed in claim 1, wherein the EE assembly has an IP6K9K protection rating according to ISO 20653:2013-02.

13. The EE assembly as claimed in claim 12, wherein the operating voltage of the EE assembly is at least 400 V.

14. The use as claimed in claim 13, wherein a CTI of 600 V determined based on IEC 60112:2009 as described in the examples section and a UL 94 V2 classification at a test specimen thickness of 1.5 mm of polycarbonate compositions containing 50% to 85% by weight of aromatic polycarbonate or aromatic polyester carbonate is attained.

15. The use of 5% to 15% by weight of a rubber-modified graft polymer having a graft substrate selected from the group consisting of acrylate rubbers, polybutadiene rubbers and styrene-butadiene block copolymer rubbers and a graft superstrate free from structural units derived from acrylonitrile and 5% to 15% by weight of at least one phosphorus-containing flame retardant for improving the CTI and the flame retardancy according to UL 94 V of aromatic polycarbonate compositions or aromatic polyester carbonate compositions.

\* \* \* \* \*